2,924,412
LAWN SPRINKLER SUPPORTING DEVICES

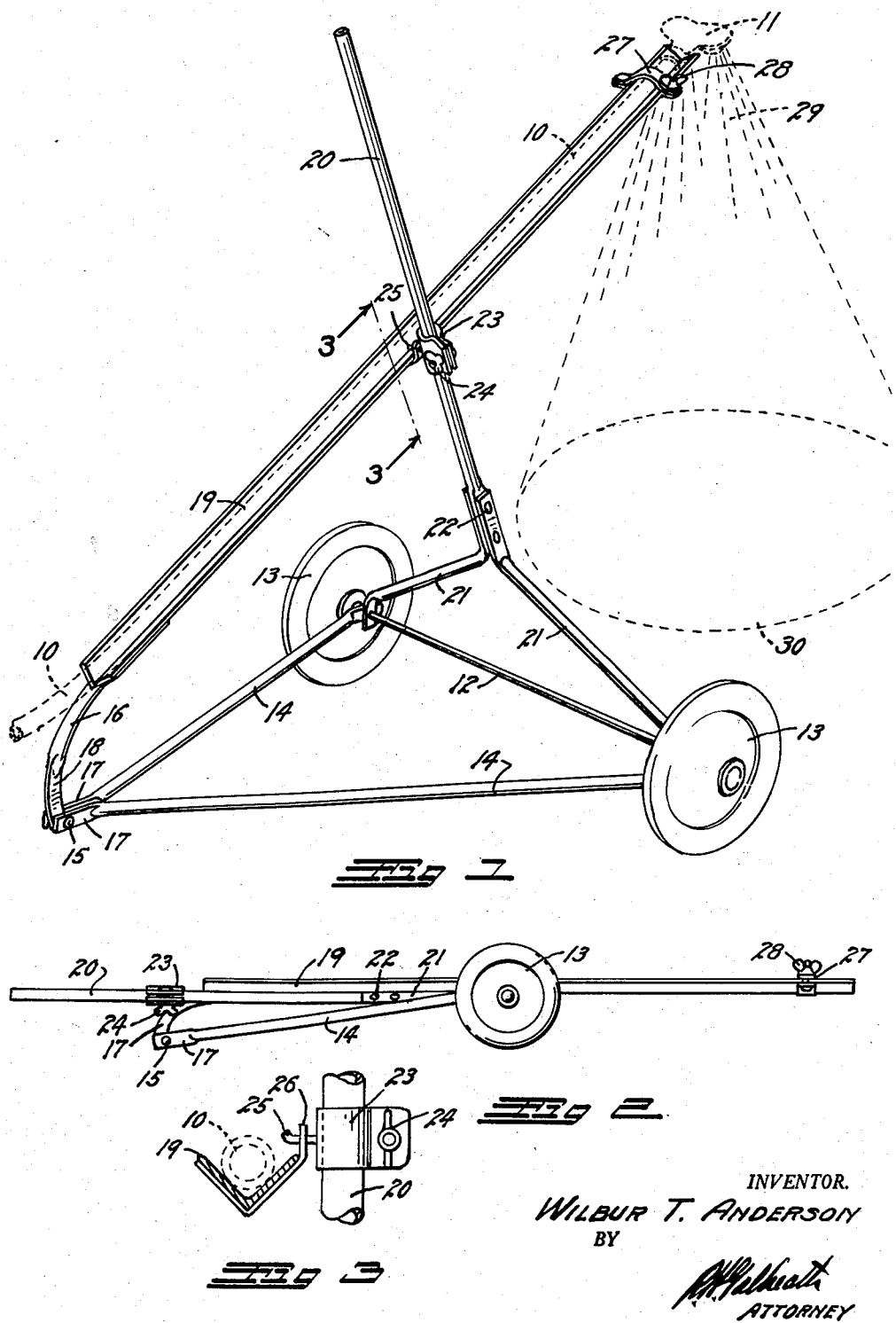

Wilbur T. Anderson, Denver, Colo.

Application November 30, 1956, Serial No. 625,501

1 Claim. (Cl. 248—80)

This invention relates to a lawn sprinkler supporting device. Conventional lawn sprinklers of the "set" type rest upon the lawn and throw a spray upwardly and outwardly about the sprinkler. This spray is difficult to control so that it will efficiently reach the lawn edges without over or underreaching. Such a spray is also subject to the wiles of the wind and will be carried beyond the area which it is desired to sprinkle.

The principal object of this invention is to provide a support for a conventional lawn sprinkling nozzle of the "set" type which will support the nozzle in inverted position above the lawn so that the spray will be directed downwardly directly onto the lawn, as opposed to the usual upwardly directed sprays.

Another object of the invention is to so construct the device that the height of the nozzle above the lawn can be quickly, easily and accurately regulated so that the area covered by the sprinkler nozzle can be accurately controlled.

A further object is to provide a device of this character which will be light in weight and provided with wheels so as to be easily portable, and to so construct the device that it can be folded into a relatively small package for storage when not in use.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved lawn sprinkler support, illustrating it as it would appear in use;

Fig. 2 is a side view of the improved sprinkled support, illustrating it on a smaller scale and in the folded or storage position; and Fig. 3 is an enlarged detail section, taken on the line 3—3, Fig. 1.

In the drawing, the position of a lawn hose is indicated in broken line at 10, with a conventional set sprinkle nozzle of the "twin" type indicated in broken line at 11.

The improved support comprises an axle 12 supported between ground-engaging wheels 13, preferably of the pneumatic-tired type. A frame tube 14 is mounted on the axle 12 adjacent each of the wheels 13. The two frame tubes extend rearwardly and inwardly toward each other and are secured together at their rearward extremities by means of a pivot bolt or rivet 15. The frame tubes are preferably formed from lightweight tubing, such as aluminum tubing, and each is flattened at both extremities to provide flat pads 17 through which the axle 12 and the rivet 15 pass.

A curvated bracket tube 16 is pivotally mounted on the rivet 15 between the rear pads 17 of the tubes 14. The bracket tube is preferably formed from light tubing flattened at its lower rear extremity, as indicated at 18, where it passes between the pads 17.

The bracket tube 16 is fixedly attached to and below the rear extremity of a channel member 19. The channel member is preferably formed from an aluminum angle bar and is set on the bracket member 16 in V relation. The attachment between the bracket member and the angle member may be by riveting, soldering, brazing, or any other suitable mode of attachment.

A supporting tube or post 20 is supported from the axle 12 upon two diagonal braces 21. The braces are also preferably formed of tubing and are mounted upon the axle 12 at their outer and lower extremities in contact or close proximity with the forward pads 17 of the frame tubes 14 and extend upwardly and inwardly to engage opposite sides of the post 20, to which they are secured by means of suitable rivets 22 or other attachment means.

The post 20 is provided with a contractable sleeve 23 which can be secured in any desired position along the post 20 by means of a suitable clamp bolt provided with a wing nut 24. A hook stud 25 projects from the sleeve 23, and a perforated ear 26 is mounted on the channel member 19 which may be hooked upon the stud 25 so that the channel member will be supported on an incline by the post 20.

The channel member is provided with a releasable hose clamp 27 which can be swung over the open top of the channel and clamped in place by means of a suitable clamp nut 28.

In use, the hose 10 is placed in the channel member so as to lie longitudinally therein and is clamped in place in the channel member by means of the hose clamp 27 so that the nozzle 11 will project upwardly and outwardly in an inverted position beyond the upper extremity of the channel member. This causes the spray, indicated at 29, to be directed downwardly to outline a definite area on the lawn, as indicated in broken line at 30. The size of the area 30 can be regulated by loosening the nut 24 and raising or lowering the sleeve 23 on the supporting post 20 so as to raise or lower the nozzle 11.

Thus, it can be seen that areas of any desired size can be accurately sprinkled, and the usual blowing of the water in the wind has been substantially eliminated. For storage purposes, the ear 26 is simply unhooked from the stud 25 and the post 20 is folded rearwardly onto the frame tubes 14 and the channel member 19 is folded forwardly onto the axle 12, as shown in Fig. 2.

While a specific form of the improvement has been described and illustrated herein, it is desired to be understood that the same may be varied within the scope of the appended claim, without departing from the spirit of the invention.

Having thus described the invention, what is claimed and desired secured by Letters Patent is:

A support for the nozzle extremity of a garden hose comprising: a wheel axle; a ground-engaging wheel rotatably mounted at each extremity of said axle; a frame member pivoted on said axle at its forward extremity and adapted to rest upon the ground at its rear extremity; a post pivotally mounted on said axle independently of the pivotal mounting of said frame member thereon and extending medially upward from said axle; a channel member having a V-shaped cross section pivoted to the rear extremity of said frame member and extending forwardly and upwardly across said post to contain and support the nozzle extremity of the hose in straight, inclined alignment; a supporting sleeve surrounding said post; clamping means on said sleeve for securing the latter at any desired elevation on said post; and supporting means on said sleeve engaging and supporting the forward extremity of said channel member, said supporting means being detachable from said channel member to allow the latter to be folded forwardly and downwardly and to allow said post to be folded rearwardly and downwardly upon said frame to provide a relatively flat package for storage purposes.

References Cited in the file of this patent

UNITED STATES PATENTS

| | | |
|---|---|---|
| 929,392 | Cole | July 27, 1909 |
| 1,748,885 | Lally | Feb. 25, 1930 |
| 1,997,947 | Pantek | Apr. 16, 1935 |
| 2,045,336 | Skoglund | June 23, 1936 |
| 2,144,890 | Nakaoka | Jan. 24, 1939 |
| 2,464,958 | Allen | Mar. 22, 1949 |
| 2,597,727 | Hanson | May 20, 1952 |